US008171166B1

(12) United States Patent
Eshet

(10) Patent No.: US 8,171,166 B1
(45) Date of Patent: May 1, 2012

(54) METHOD AND A COMPUTER PROGRAM PRODUCT FOR MODIFYING OR GENERATING A MULTIPLE PROGRAM TRANSPORT STREAM

(75) Inventor: Amit Eshet, Kiryat-Tivon (IL)

(73) Assignee: ARRIS Group, Inc., Suwanee, GA (US)

( * ) Notice: Subject to any disclaimer, the term of this patent is extended or adjusted under 35 U.S.C. 154(b) by 645 days.

(21) Appl. No.: 11/967,421

(22) Filed: Dec. 31, 2007

Related U.S. Application Data

(60) Provisional application No. 60/945,926, filed on Jun. 24, 2007.

(51) Int. Cl.
*G06F 15/16* (2006.01)

(52) U.S. Cl. .......................... 709/246; 370/389; 370/535

(58) Field of Classification Search .................. 709/231, 709/246, 247; 370/535, 586, 389
See application file for complete search history.

(56) References Cited

U.S. PATENT DOCUMENTS

| | | | |
|---|---|---|---|
| 6,252,873 B1 * | 6/2001 | Vines | 370/389 |
| 6,266,384 B1 * | 7/2001 | Acampora et al. | 375/363 |
| 6,269,107 B1 * | 7/2001 | Jong | 370/535 |
| 6,674,804 B1 | 1/2004 | Eshet | |
| 6,873,629 B2 * | 3/2005 | Morris | 370/535 |
| 7,027,516 B2 * | 4/2006 | Anderson et al. | 375/240.26 |
| 7,039,048 B1 * | 5/2006 | Monta et al. | 370/389 |
| 7,508,845 B2 * | 3/2009 | Baker | 370/516 |
| 7,509,029 B2 * | 3/2009 | Nonaka et al. | 386/124 |
| 2002/0067744 A1 * | 6/2002 | Fujii et al. | 370/535 |
| 2007/0028026 A1 * | 2/2007 | Yeh et al. | 711/4 |
| 2007/0133693 A1 * | 6/2007 | Gan et al. | 375/240.26 |

* cited by examiner

*Primary Examiner* — Yves Dalencourt
(74) *Attorney, Agent, or Firm* — Troy A. Van Aacken; Robert J. Starr

(57) ABSTRACT

Methods and computer program products for modifying a multiple program transport stream, generating a multiple program transport stream and extracting a single program transport stream, the method for modifying the multiple program transport stream includes: receiving a multiple program transport stream; and inserting a decoding time stamp equivalent value program clock reference in a transport stream packet of a program; wherein the transport stream packet is positioned so as the value of the inserted decoding time stamp equivalent value program clock reference is substantially equal to a decoding time stamp of an elementary stream of the program.

15 Claims, 6 Drawing Sheets ns in claims priority is a US. provisional
METHOD AND A COMPUTER PROGRAM PRODUCT FOR MODIFYING OR GENERATING A MULTIPLE PROGRAM TRANSPORT STREAM

RELATED APPLICATIONS

This application claims priority from U.S. provisional patent serial number filing 60/945,926 date Jun. 24, 2007.

FIELD OF THE INVENTION

The present invention relates to communication methods in general and to methods for generating programs.

BACKGROUND OF THE INVENTION

Methods and systems for compressing and transmitting media signals are known in the art. Compressed digital video is largely becoming the preferred medium to transmit video to viewers everywhere. Part of the Moving Pictures Experts Group (MPEG) specifications are standardized methods for compressing and transmitting video. Various audio compression techniques, including MPEG compliant techniques, are also known in the art. In general, MPEG is used today for transmitting video over terrestrial, wireless, satellite and cable communication channels and also for storing digital video.

An audio stream is organized as an ordered sequence of frames. A video stream is usually organized as an ordered sequence of pictures; each picture includes a plurality of pixels. A video picture includes a plurality of slices, each slice including a plurality of macro blocks. The audio and video streams are provided to an audio encoder and video encoder respectively to generate compressed audio and video elementary streams, also referred to as elementary streams.

Elementary streams are packetized to produce PES packets. PES packets made up of elementary streams that form a program share a common time base. The PES packets may also include additional information. PES packets of distinct elementary streams can be arranged as a program stream or a transport stream. A transport stream combines one or more programs with one or more independent time bases into a single stream. A transport stream that includes a single program is referred to as a single program transport stream (SPTS) while a transport stream that combines multiple programs is referred to as a multiple program transport stream (MPTS).

Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

The PSI tables are embedded within transport stream packets that have unique PID values that distinguish them from the elementary stream conveying transport stream packets.

Each program includes timing information that allows a reconstruction of the programs time base. The timing information is known as program clock reference (program clock reference). Not each transport packet includes a program clock reference. According to various standards program clock references should be transmitted at least once per 100 milliseconds or at least once per 40 milliseconds. The program clock reference is included in an adaptation field, as illustrated by the following tables.

TABLE 1

Partial transport stream packet format

| Name | Number of bits | |
|---|---|---|
| sync byte | 8 | 0x47 |
| Transport Error Indicator (TEI) | 1 | Set by demodulator if can't correct errors in the stream |
| Payload Unit Start Indicator | 1 | 1 means start of PES data or PSI otherwise zero only. |
| Transport Priority | 1 | One means higher priority than other packets with the same PID. |
| PID | 13 | Packet ID |
| Scrambling control | 2 | '00' = Not scrambled. The following per DVB spec: '01' = Reserved for future use, '10' = Scrambled with evenkey, '11' = Scrambled with odd key |
| Adaptation field exist | 1 | 1 means presence of the adaptation field |
| Payload data exist | 1 | 1 means presence of data |
| Continuity counter | 4 | |
| | | Note: the total number of bits above is 32 and is called the transport stream 4-byte prefix. |
| Adaptation field | 0 or more | Depends on flags |
| Payload Data | 0 or more | Depends on flags |

TABLE 2 adaptation field format

| Name | Number of bits | Description |
|---|---|---|
| Adaptation Field Length | 8 | Number of bytes in the adaptation field immediately following this byte |
| Discontinuity indicator | 1 | Set to 1 if a discontinuity occurred in the continuity counter of the TS packet |
| Random Access indicator | 1 | Set to 1 if the PES packet in this TS packet starts a video/audio sequence |
| Elementary stream priority indicator | 1 | 1 = higher priority |
| program clock reference flag | 1 | 1 means adaptation field does contain a program clock reference field |
| Program clock reference flag | 1 | |
| Splicing point flag | 1 | 1 means presence of splice countdown field in adaptation field |
| Transport private data flag | 1 | 1 means presence of private data bytes in adaptation field |
| Adaptation field extension flag | 1 | 1 means presence of adaptation field extension |
| Below fields are optional | variable | Depends on flags |
| PCR | 33+9 | Program clock reference |
| OPCR | 33+9 | Original Program clock reference. Helps when one TS is copied into another |
| Splice countdown | 8 | Indicates how many TS packets from this one a splicing point occurs (may be negative) |
| stuffing bytes | variable | |

The multiple program transport stream is generated in view of strict timing constraints. Transport stream packets of each program that forms the multiple program transport stream are timed such as not to cause overflows or underflows in target decoders that are expected to decode the elementary streams of that program.

Underflow and overflow are avoided by a resource consuming stage of modeling the buffers of each target decoder and determining the timing of transport stream packets in a manner that avoids overflows and underflows. The characteristics of the target decoder are defined in the MPEG specifications. They are collectively known as T-STD (Transport-System Target Decoder). One important buffer included in the T-STD is known as EB.

Timing information embedded within the transport stream packets also reflects the overall bit rate of the whole multiple program transport stream. For example, the bit rate of the whole multiple program transport stream can be determined by dividing (i) the number of transport stream packets between the transport stream packets that include these two consecutive program time references multiplied by the number of bits per packet by (ii) the timing difference between two consecutive program time references (of the same program).

In various scenarios there is a need to extract a single program transport stream out of a multiple program transport streams. Without specific pre-processing or expensive processing such as de-jittering & buffer modeling, as well as buffering, simply extracting the PIDs of a program from a multiple program transport stream would yield an illegal and non-complying single program transport stream in most cases. Generally, one cannot assume that down stream devices would be able to cope with non-compliant streams.

Many devices, however, do attempt to perform the extraction in a non-expensive manner, hoping for the best and yet usually producing non-compliant streams. One must assume that these devices would continue to be utilized.

Accordingly, there is a need to provide methods, devices and computer program products that will enable an easy extraction of a single program transport stream out of a multiple program transport stream.

SUMMARY OF THE INVENTION

A method for modifying a multiple program transport stream, the method including: receiving a multiple program transport stream; and inserting a decoding time stamp equivalent value program clock reference in a transport stream packet of a program; wherein the transport stream packet is positioned so as the value of the inserted decoding time stamp equivalent value program clock reference is substantially equal to a decoding time stamp of an elementary stream of the program.

Conveniently, the method includes inserting the decoding time stamp equivalent valued program clock reference in a new transport stream packet.

Conveniently, the method includes inserting the decoding time stamp equivalent valued program clock reference in a new transport stream packet that is associated with a new packet identifier value.

Conveniently, the method includes determining whether to insert the decoding time stamp equivalent valued program clock reference in response to an estimation that an overflow or a underflow are expected to occur if such a program clock reference is not inserted.

Conveniently, the method includes altering program clock references of another program of the multiple program transport stream in response to a change in a size of the multiple program transport stream resulting from the inserting of the decoding time stamp equivalent valued program clock reference.

A method for generating a multiple program transport stream, the method including: receiving multiple elementary streams that includes multiple decoding time stamps; and generating a multiple program transport stream that includes a plurality of decoding time stamp equivalent valued program clock reference that have values that substantially equal a plurality of decoding time stamps.

Conveniently, the method includes determining whether to generate a decoding time stamp equivalent valued program clock reference in response to an estimation that an overflow or a underflow are expected to occur if such a program clock reference is not generated.

A method for extracting a single program transport stream, the method including: receiving a multiple program transport stream; extracting, by performing program identifier filtering, a single program transport stream from the multiple program transport stream; wherein the single program transport stream includes multiple decoding time stamp equivalent valued program clock reference.

Conveniently, the method includes processing decoding time stamp equivalent valued program clock references that are embedded in empty payload transport stream packets.

A computer program product including a computer usable medium including a computer readable program, wherein the computer readable program when executed on a computer causes the computer to: generate a decoding time stamp equivalent value program clock reference to be embedded in a transport stream packet of a program; wherein the transport stream packet is positioned so as the value of the inserted decoding time stamp equivalent value program clock reference is substantially equal to a decoding time stamp of an elementary stream of the program; and include the decoding time stamp equivalent value program clock reference in a multiple program transport stream.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE DRAWINGS

For simplicity of explanation the following description refers to MPEG-2 compliant stream. Those skilled in the art will appreciate that the methods and computer program products can be applied mutatis mutandis to other media formats.

A transport stream is provided, usually via a communication medium, to a target decoder that decodes the encoded elementary streams within the transport stream. The decoding of encoded elementary stream is based upon timing information embedded within transport stream packets. Such timing information includes various time stamps such as decoding time stamp (DTS) and presentation time stamp (PTS), decoding time stamp indicating the time that an access unit is decoded at the target decoder to provide a presentation unit, PTS indicating the time that the presentation unit is presented at the target decoder.

Decoding time stamps are included within PES packet headers and within payloads of transport stream packets. There is no correlation between transport stream packets that include decoding time stamps and transport stream packets that include program clock references.

In order to guarantee that a legal single program transport stream can be easily extracted from a multiple program transport stream program clock references (referred to as decoding time stamp equivalent value program clock references) are included in key positions (having key values) within the multiple program transport stream.

Conveniently, the decoding time stamp equivalent value program clock references are inserted in a position such that their value would substantially equal the decoding time stamps of the video access units and the audio access units that belong to the video and audio elementary streams that form a program to be extracted to provide a legal single program transport stream. Conveniently, a value of a decoding time stamp equivalent value program clock reference is equal to the value of a DTS or is slightly smaller than the value of the DTS.

Accordingly, a single program will now include multiple video decoding time stamp equivalent value program clock references and multiple audio decoding time stamp equivalent value program clock references.

Those of skill in the art will appreciate that in MPEG, the timing of transport stream packets of a certain program is bounded by the timing of the neighboring program clock references of the certain program. By providing decoding time stamp equivalent value program clock references it is guaranteed that all transport stream packets that belong to the certain program and are positioned between consecutive decoding time stamp equivalent value program clock references will be transmitted between these consecutive decoding time stamps. Accordingly, this prevents underflows or overflows at a target decoder after the SPTS is filtered and sent to the target decoder.

Figure 1:
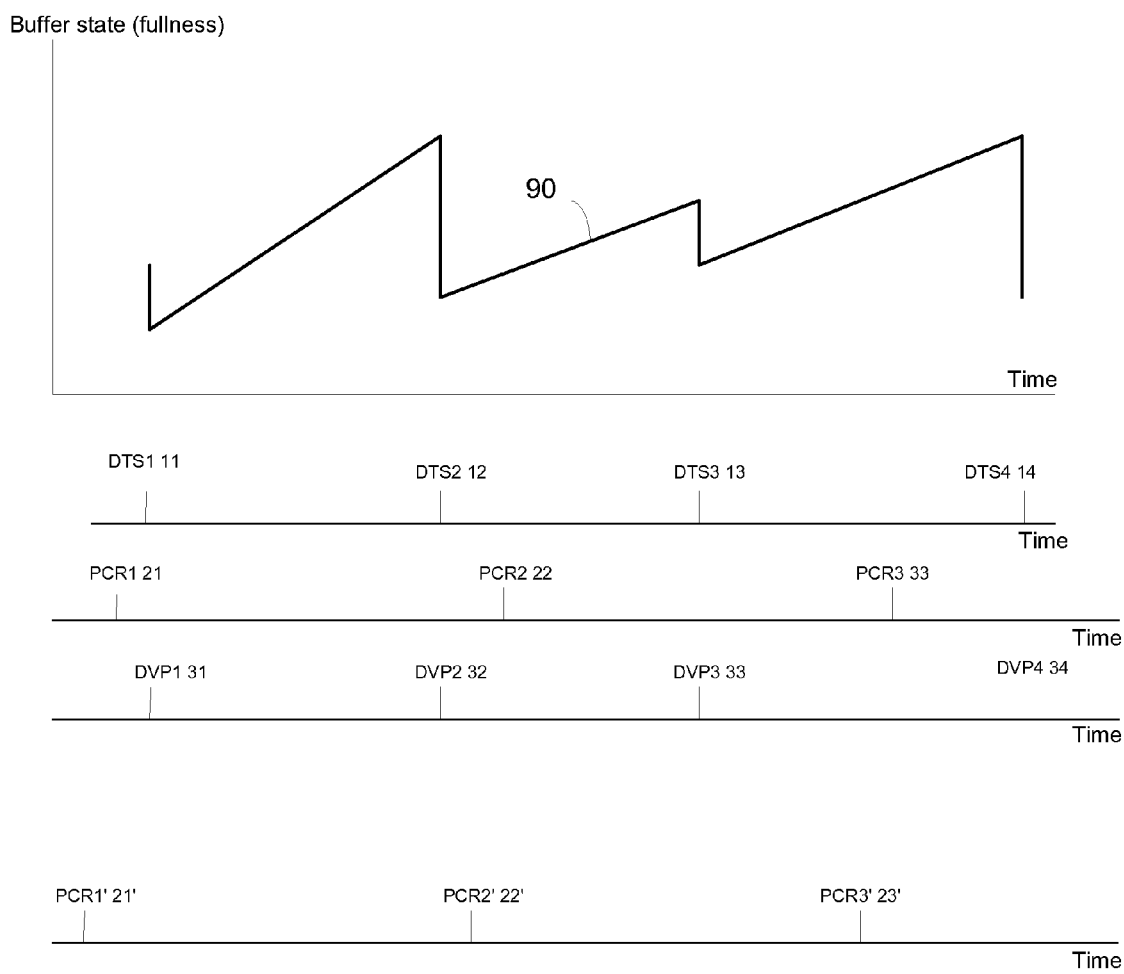
FIG. 1 is a timing diagram according to an embodiment of the invention.

FIG. 1 illustrates a sample timing relationships between decoding time stamps DTS1-DTS4 11-14 of a certain elementary stream, program clock references PCR1-PCR3 21-23 of a certain program that includes the certain elementary stream, decoding time stamp equivalent value program clock references DVP1-DVP4 31-34 of the certain elementary stream and program clock references PCR1'-PCR3' 21'-23' of another program that does not include the certain elementary stream, according to an embodiment of the invention.

These mentioned above timing information are embedded in transport stream packets of a multiple program transport stream. For simplicity of explanation only few packets were shown.

FIG. 1 also includes graph 90 that illustrates a simulated state of a decoder buffer (EB). Graph 90 illustrates that the buffer is filled between decoding time stamps (such as DTS1 11, DTS2 12 and DTS 3 13) and is emptied at these decoding time stamps. The buffer is emptied when the decoding elements of the decoder fetch elementary stream information (audio or video).

Once the decoding time stamp equivalent value program clock references are inserted all transport stream packets of an access unit will be transmitted according to the decoding time stamps of that access unit. Especially, transport stream packets that are positioned between a first decoding time stamp equivalent value program clock reference and a second decoding time stamp equivalent value program clock reference will be transmitted before the second decoding time stamp equivalent value program clock reference and will arrive to the target decoder prior the second decoding time stamp equivalent value program clock reference.

Conveniently, between those first and second decoding time stamp equivalent value program clock references the maximal data transmitted from a given elementary stream is limited to a single access unit that has a decoding time stamp that substantially equals the decoding time stamp of the second decoding time stamp equivalent value program clock reference.

Buffer wise, it does not matter exactly when the transport stream packets that convey the access unit within this interval (as long as it is not too bursty) are transmitted. As such, by embedding decoding time stamp equivalent value program clock references it is guaranteed that the overall data originally transmitted between two decoding time stamps from a given elementary stream remains the same. As such, no new overflow may result. Furthermore, as the packets are evenly spaced between two decoding time stamp equivalent value program clock references a lower burstiness level is achieved.

Conveniently, when the decoding time stamp equivalent value program clock references are added to an already generated multiple program transport stream they should be embedded in new (conveniently empty payload) transport stream packets. These new transport stream packets can be referred to as decoding time stamp equivalent value program clock reference conveying transport stream packets or can be referred to as new transport stream packets.

According to another embodiment of the invention if these program clock references are generated during the generation of a new multiple program transport stream then they can be embedded in payload conveying transport stream packets.

If the decoding time stamp equivalent value program clock references are included in new transport stream packets the overall size (and accordingly—the required bit rate) of the multiple program transport stream increases. The increment can be relatively small (in some cases about one percent increment).

According to an embodiment of the invention this size increment can be reduced or totally eliminated: it is possible to simulate the buffers of the target decoders and include decoding time stamp equivalent value program clock references only if the simulation indicates that an overflow or an underflow would result if such decoding time stamp equivalent value program clock references are not to be embedded in the multiple program transport stream.

It is noted that if the mentioned above new transport stream packets are added (multiplexed to the multiple program transport stream) then the program clock references of the various programs that are included in the multiple program transport stream should be altered in order to reflect the size change and the additional bit rate required to transmit the multiple program transport stream.

This operation is known as PCR re-stamping and it actually re-positions the transport stream packets of the multiple program transport stream. It is time consuming and requires a simulation of the state of various target decoders buffers. This can be easily done during a pre-processing stage but is more difficult to execute by simpler edge devices or end user devices. This PCR re-stamping can be applied while using prior art methods.

Continuity counter re-stamping for the program clock reference PID can be required due to the extra packets, although if payload empty packets are added this continuity counter should not be necessarily re-stamped.

According to an embodiment of the invention new transport stream packets that include decoding time stamp equivalent value program clock references include a unique PID value that distinguishes them from the transport packets that convey the elementary streams. In this case there is no need to re-stamp the continuity counter. This unique PID should be included in the PSI tables. Thus, the PSI table can indicate that the program clock references are associated with the unique PID.

The "old" program clock references (PCRS that were included in the multiple program transport stream before the inclusion of the decoding time stamp equivalent value program clock references) can be left as is or replaced by stuffing. Their values may need to be slightly amended as mentioned above.

It is noted that decoding time stamp equivalent value program clock references can be added to encrypted programs. Encrypted programs have non-encrypted transport stream headers.

If the single program transport stream are later multiplexed back into a multiple program transport stream some of these program clock references can be dropped to save bandwidth.

Once such decoding time stamp equivalent value program clock references are included in the multiple program transport stream the extraction of single program transport stream (that includes such program clock references) is not complex and involves simple PID filtering+PAT addition/update.

It is noted that if an "old" PCR already has a value that is substantially equals the value of DTS it is not necessarily to insert a decoding time stamp equivalent value program clock reference.

Figure 2:
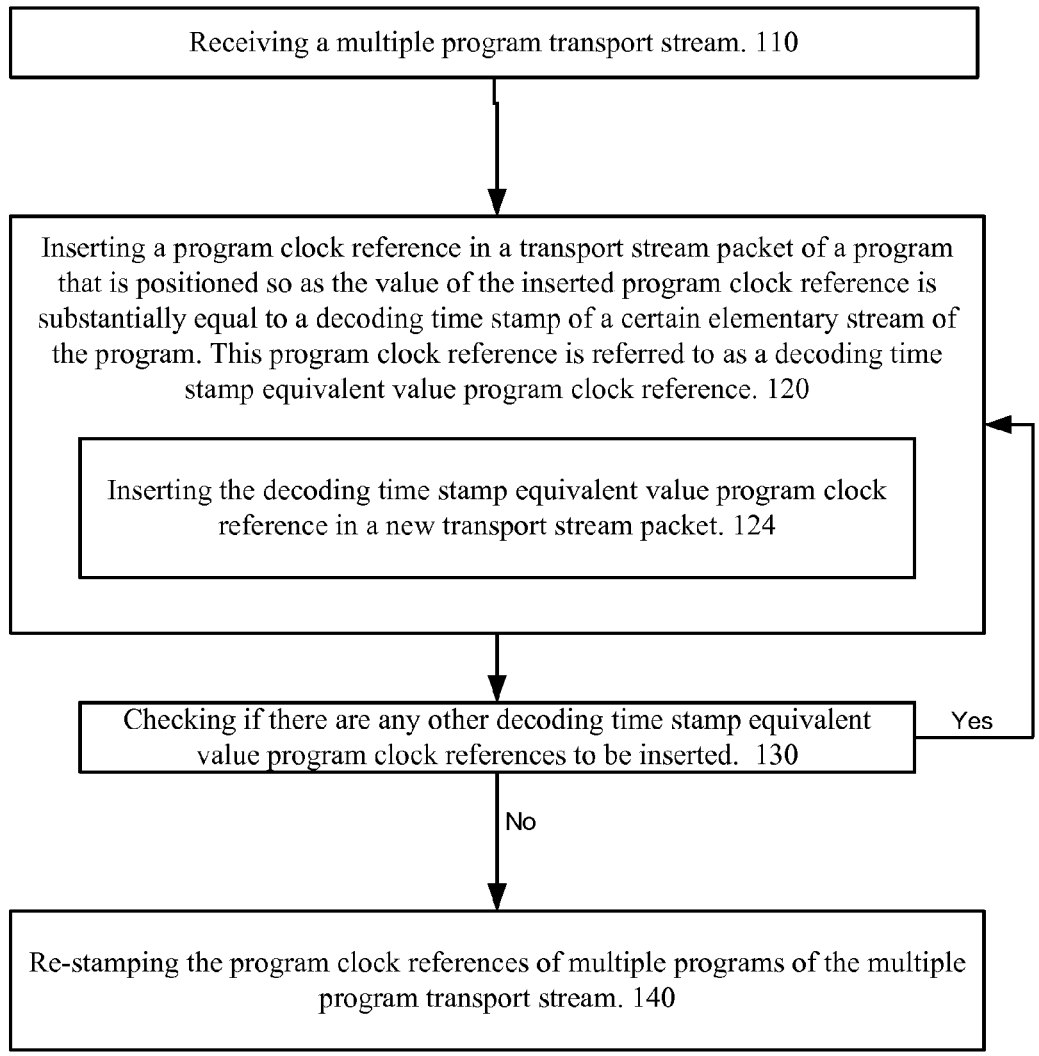
FIG. 2 illustrates a method for modifying a multiple program transport stream according to an embodiment of the invention.

FIG. 2 illustrates method 100 for modifying a multiple program transport stream, according to an embodiment of the invention.

Method 100 starts by stage 110 of receiving a multiple program transport stream.

Stage 110 is followed by stage 120 of inserting a program clock reference in a transport stream packet of a program that is positioned so as the value of the inserted program clock reference is substantially equal to a decoding time stamp of a certain elementary stream of the program. This program clock reference is referred to as a decoding time stamp equivalent value program clock reference.

Conveniently, stage 120 includes stage 124 of inserting the decoding time stamp equivalent value program clock reference in a new transport stream packet.

This new transport stream packet can be without a payload (empty payload).

According to an embodiment of the invention stage 124 includes inserting the decoding time stamp equivalent value program clock reference in a new transport stream packet that has a PID value that differs from the PID value of transport stream packets that convey the certain elementary stream. In this case the new PID value should appear in the PMT table as belonging to the program that includes the certain elementary stream.

According to another embodiment of the invention stage 124 includes inserting the decoding time stamp equivalent value program clock reference in a new transport stream packet that has the same PID value as the PID value of transport stream packets that convey the certain elementary stream. It this case method 100 can include re-stamping the continuity counter but this is not necessarily so.

Stage 120 is followed by stage 130 of checking if there are any other decoding time stamp equivalent value program clock references to be inserted. It is noted that not all programs within the multiple program transport stream should be processed in the mentioned above manner. Some (which are not expected to be extracted) can remain "as is".

If the answer is positive stage 130 is followed by stage 120 and a new decoding time stamp equivalent value program clock reference is inserted. Else, stage 130 is followed by stage 140.

The insertion of new transport stream packets requires re-stamping the program clock references of the various programs that form the multiple program transport stream, to reflect the size change of that multiple program transport stream.

This is illustrated by stage 140 of re-stamping the program clock references of multiple programs of the multiple program transport stream.

Figure 3:
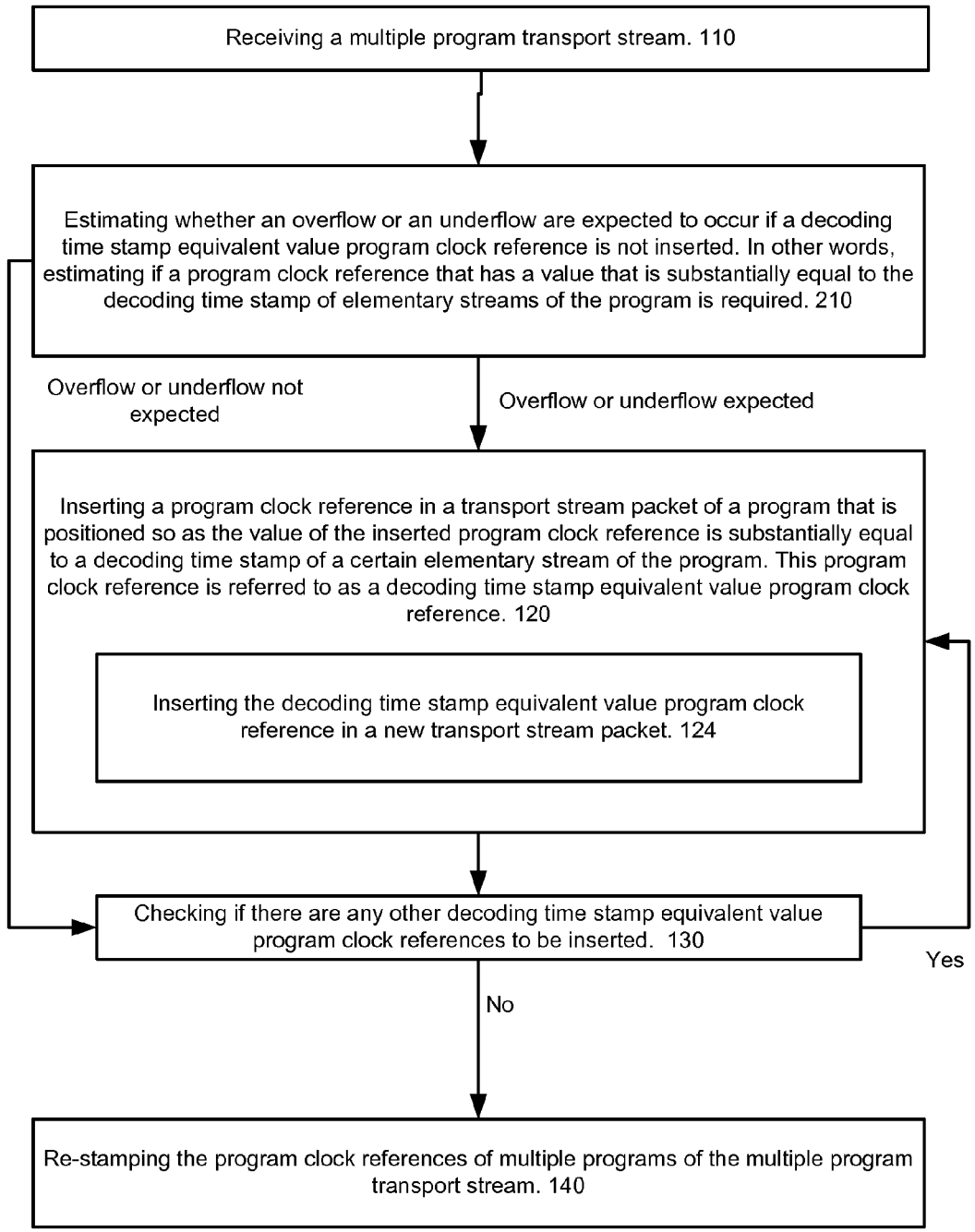
FIG. 3 illustrates a method for modifying a multiple program transport stream according to another embodiment of the invention.

FIG. 3 illustrates method 200 for modifying a multiple program transport stream, according to another embodiment of the invention.

Method 200 starts by stage 110 of receiving a multiple program transport stream.

Stage 110 is followed by stage 210 of estimating whether an overflow or an underflow are expected to occur if a decoding time stamp equivalent value program clock reference is not inserted. In other words, stage 210 includes estimating if a program clock reference that has a value that is substantially equal to the decoding time stamp of elementary streams of the program is required.

If the answer is positive (an overflow or an underflow will occur unless the decoding time stamp equivalent value program clock reference is inserted) then stage 210 is followed by stage 120 of inserting a decoding time stamp equivalent value program clock reference.

Else, stage 210 is followed by stage 132 of checking if there are any other decoding time stamp equivalent value program clock references to be evaluated.

If the answer (of stage 132) is positive then stage 132 is followed by stage 210 and an insertion of a new decoding time stamp equivalent value program clock reference is evaluated. Else, stage 132 is followed by stage 140.

The insertion of new transport stream packets requires re-stamping the program clock references of the various programs that form the multiple program transport stream, to reflect the size change of that multiple program transport stream.

This is illustrated by stage 140 of re-stamping the program clock references of multiple programs of the multiple program transport stream.

Figure 4:
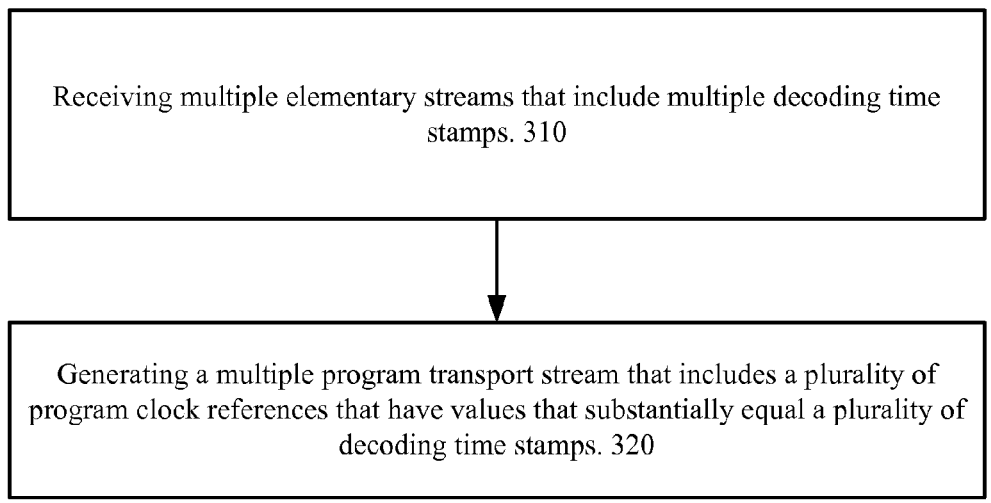
FIG. 4 illustrates a method for generating a multiple program transport stream according to yet another embodiment of the invention.

FIG. 4 illustrates method 300 for generating a multiple program transport stream, according to an embodiment of the invention.

Method 300 starts by stage 310 of receiving multiple elementary streams that includes multiple decoding time stamps.

Stage 310 is followed by stage 320 of generating a multiple program transport stream that includes a plurality of program clock references that have values that substantially equal a plurality of decoding time stamps.

According to an embodiment of the invention method 300 includes determining whether to generate a program clock reference that has a value that is substantially equal to the decoding time stamp of an elementary stream of the program in response to an estimation that an overflow or a underflow are expected to occur if such a program clock reference is not generated.

Figure 5:
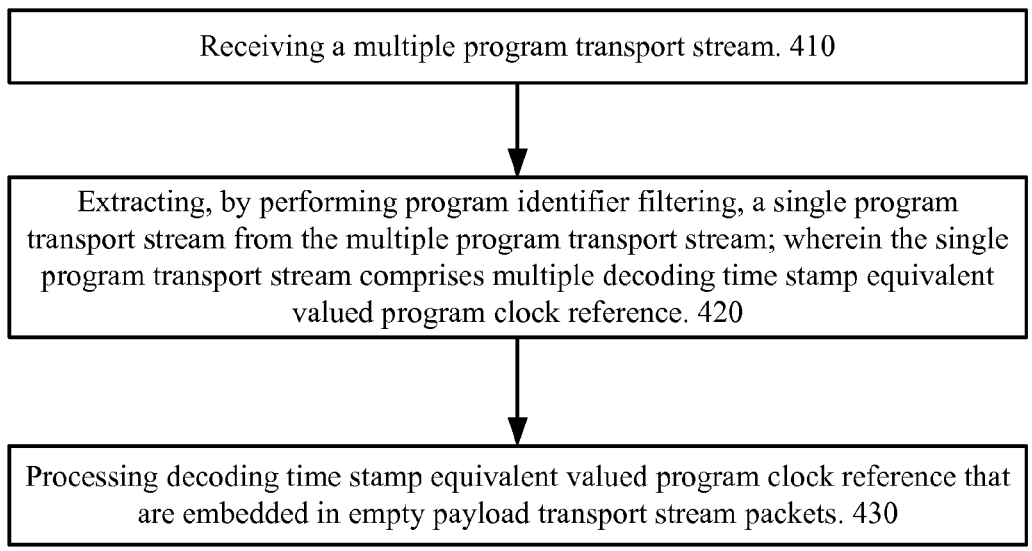
FIG. 5 illustrates a method for extracting a single program transport stream, according to an embodiment of the invention.
Figure 6:
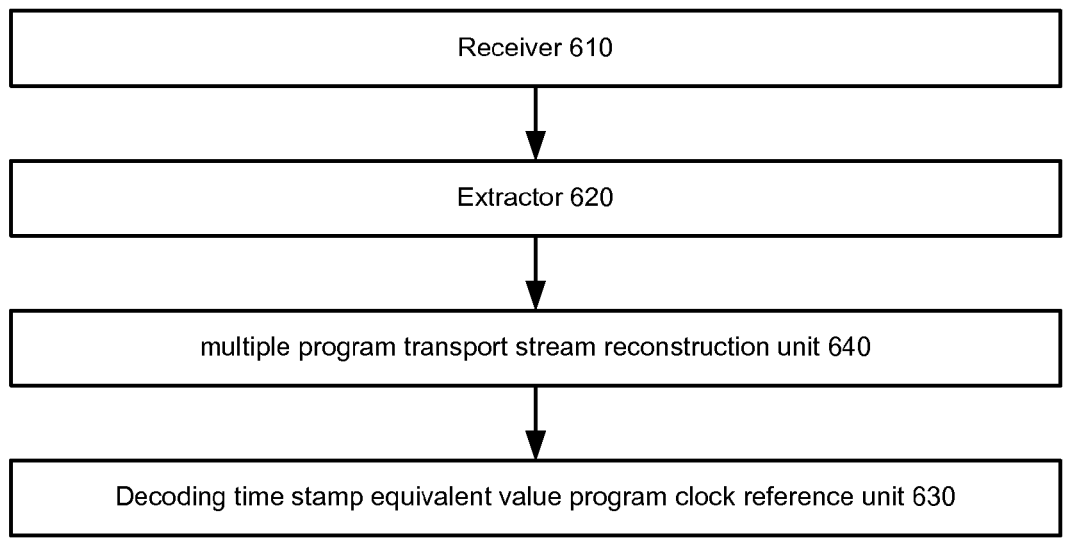
FIG. 6 illustrates a system according to an embodiment of the invention.

FIG. 5 illustrates method 400 for extracting a single program transport stream, according to an embodiment of the invention.

Method 400 starts by stage 410 of receiving a multiple program transport stream.

Stage 410 is followed by stage 420 of extracting, by performing program identifier filtering, a single program transport stream from the multiple program transport stream; wherein the single program transport stream comprises multiple decoding time stamp equivalent valued program clock reference.

Conveniently, stage 420 is followed by stage 430 of processing decoding time stamp equivalent valued program clock reference that are embedded in empty payload transport stream packets.

Each of the mentioned above methods can be executed by a computer that is provided with one or more computer readable programs. These one or more computer readable programs can be included in one or more computer usable mediums of one or more computer program products.

For example, a computer usable medium can be provided. It includes a computer readable program, wherein the computer readable program when executed on a computer causes the computer to: generate a decoding time stamp equivalent value program clock reference to be embedded in a transport stream packet of a program; wherein the transport stream packet is positioned so as the value of the inserted decoding time stamp equivalent value program clock reference is substantially equal to a decoding time stamp of an elementary stream of the program; and include the decoding time stamp equivalent value program clock reference in a multiple program transport stream.

Conveniently, the computer readable program, wherein the computer readable program when executed on a computer causes the computer to receive a multiple program transport stream; and to insert the decoding time stamp equivalent value program clock reference in a new transport stream packet of a program.

Conveniently, the computer readable program when executed on a computer causes the computer to insert the decoding time stamp equivalent valued program clock reference in a new transport stream packet that is associated with a new packet identifier value.

Conveniently, the computer readable program when executed on a computer causes the computer to determine whether to insert the decoding time stamp equivalent valued program clock reference in response to an estimation that an overflow or a underflow are expected to occur if such a program clock reference is not inserted.

Conveniently, the computer readable program when executed on a computer causes the computer to alter program clock references of another program of the multiple program transport stream in response to a change in a size of the multiple program transport stream resulting from the inserting of the decoding time stamp equivalent valued program clock reference.

Conveniently, the computer readable program when executed on a computer causes the computer to generate the multiple program transport stream such as to include the decoding time stamp equivalent value program clock reference.

Conveniently, the computer readable program when executed on a computer causes the computer to determine whether to generate a decoding time stamp equivalent valued program clock reference in response to an estimation that an overflow or a underflow are expected to occur if such a program clock reference is not generated.

I claim:

1. A method for modifying a multiple program transport stream using a computer, the method comprising:
   receiving a multiple program transport stream that comprises multiple program clock references;
   inserting a decoding time stamp equivalent valued program clock reference in a transport stream packet of an access unit of a program so that the multiple program transport stream comprises the multiple program clock references and the decoding time stamp equivalent valued program clock reference; wherein the decoding time stamp equivalent program clock reference is a program clock reference that has a value that is either equal to a value of a decoding time stamp of the access unit or slightly smaller than the value of the decoding time stamp of the access unit; wherein the transport stream packet is positioned so that the inserted decoding time stamp equivalent value program clock reference is equal to a decoding time stamp of an elementary stream of the program; and
   altering program clock references of another program of the multiple program transport stream in response to a change in a size of the multiple program transport stream resulting from the inserting.

2. The method according to claim 1 comprising inserting the decoding time stamp equivalent valued program clock reference in a new transport stream packet that comprises an empty payload.

3. The method according to claim 1 comprising inserting the decoding time stamp equivalent valued program clock reference in a new transport stream packet that is associated with a new packet identifier value.

4. The method according to claim 1 comprising determining whether to insert the decoding time stamp equivalent valued program clock reference in response to an estimation that an overflow or an underflow are expected to occur if the program clock reference is not inserted.

5. A method for generating a multiple program transport stream using a computer, the method comprising:
   receiving multiple elementary streams that comprises multiple decoding time stamps;
   generating a multiple program transport stream that comprises multiple program clock references that are spaced apart from each other at predefined time intervals and a plurality of decoding time stamp equivalent valued program clock reference that have values that equal a plurality of decoding time stamps; and
   determining whether to generate a decoding time stamp equivalent valued program clock reference in response to an estimation that an overflow or an underflow are expected to occur if the program clock reference is not generated.

6. A method for extracting a single program transport stream using a computer, the method comprising:
   receiving a multiple program transport stream;
   extracting, by performing program identifier filtering, a single program transport stream from the multiple program transport stream;
   wherein the single program transport stream comprises multiple program clock references that are spaced apart from each other at predefined time intervals and multiple decoding time stamp equivalent valued program clock reference; and
   altering program clock references of another program of the multiple program transport stream in response to a change in a size of the multiple program transport stream resulting from the inserting.

7. The method according to claim 6 comprising processing decoding time stamp equivalent valued program clock reference that are embedded in empty payload transport stream packets.

8. A computer program product comprising a non-transitory computer usable medium including a computer readable program, wherein the computer readable program when executed on a computer causes the computer to: generate a decoding time stamp equivalent value program clock reference to be embedded in a transport stream packet of a program; wherein the transport stream packet is positioned so that the inserted decoding time stamp equivalent value program clock reference is substantially equal to a decoding time stamp of an elementary stream of the program; and include the decoding time stamp equivalent value program clock reference in a multiple program transport stream that also comprises multiple program clock references that are spaced apart from each other at predefined time intervals; and wherein the computer readable program when executed on a computer causes the computer to alter program clock references of another program of the multiple program transport stream in response to a change in a size of the multiple program transport stream resulting from the inserting of the decoding time stamp equivalent valued program clock reference.

9. The computer program product according to claim 8, wherein the computer readable program when executed on a computer causes the computer to receive a multiple program transport stream; and to insert the decoding time stamp equivalent value program clock reference in a new transport stream packet of a program.

10. The computer program product according to claim 9, wherein the computer readable program when executed on a computer causes the computer to insert the decoding time stamp equivalent valued program clock reference in a new transport stream packet that is associated with a new packet identifier value.

11. The computer program product according to claim 9, wherein the computer readable program when executed on a computer causes the computer to determine whether to insert the decoding time stamp equivalent valued program clock reference in response to an estimation that an overflow or an underflow are expected to occur if the program clock reference is not inserted.

12. The computer program product according to claim 8, wherein the computer readable program when executed on a computer causes the computer to generate the multiple program transport stream to include the decoding time stamp equivalent value program clock reference.

13. The computer program product according to claim 12, wherein the computer readable program when executed on a computer causes the computer to determine whether to generate a decoding time stamp equivalent valued program clock reference in response to an estimation that an overflow or an underflow are expected to occur if the program clock reference is not generated.

14. A computer program product comprising a non-transitory computer usable medium including a computer readable program, wherein the computer readable program when executed on a computer causes the computer to: receive a multiple program transport stream; and extract, by performing program identifier filtering, a single program transport stream from the multiple program transport stream; wherein the single program transport stream comprises multiple program clock references that are spaced apart from each other at predefined time intervals and multiple decoding time stamp equivalent valued program clock reference; and wherein the computer readable program when executed on a computer causes the computer to alter program clock references of another program of the multiple program transport stream in response to a change in a size of the multiple program transport stream resulting from the inserting of the decoding time stamp equivalent valued program clock reference.

15. The computer program product according to claim 14, wherein the computer readable program when executed on a computer causes the computer to process decoding time stamp equivalent valued program clock reference that are embedded in empty payload transport stream packets.

\* \* \* \* \*